US010006478B2

(12) United States Patent
Hufnagl et al.

(10) Patent No.: US 10,006,478 B2
(45) Date of Patent: Jun. 26, 2018

(54) BLIND FASTENERS

(71) Applicant: Alcoa Inc., Pittsburgh, PA (US)

(72) Inventors: Gerhart Hufnagl, Tucson, AZ (US);
Douglas DeSalvo, Tucson, AZ (US);
Randy Torrence, Tucson, AZ (US)

(73) Assignee: Arconic Inc., Pittsburgh, PA (US)

( * ) Notice: Subject to any disclaimer, the term of this patent is extended or adjusted under 35 U.S.C. 154(b) by 225 days.

(21) Appl. No.: 15/001,979

(22) Filed: Jan. 20, 2016

(65) Prior Publication Data

US 2016/0215804 A1    Jul. 28, 2016

Related U.S. Application Data

(60) Provisional application No. 62/106,499, filed on Jan. 22, 2015, provisional application No. 62/118,037,
(Continued)

(51) Int. Cl.
*F16B 13/06* (2006.01)
*F16B 19/10* (2006.01)
(Continued)

(52) U.S. Cl.
CPC .......... *F16B 13/061* (2013.01); *F16B 5/0258* (2013.01); *F16B 5/04* (2013.01); *F16B 19/1054* (2013.01); *F16B 19/1072* (2013.01)

(58) Field of Classification Search
CPC ... F16B 19/1072; F16B 13/045; F16B 13/061
(Continued)

(56) References Cited

U.S. PATENT DOCUMENTS 2,324,142 A    7/1943 Eklund
2,415,560 A *  2/1947 Higley .................... F16B 19/12
                                              29/421.1
(Continued)

FOREIGN PATENT DOCUMENTS

CA    2868329    5/2015
CN    1791493 A  6/2006
(Continued)

OTHER PUBLICATIONS

International Search Report and Written Opinion dated Apr. 28, 2016, issued by the European Patent Office in International (PCT) Application No. PCT/US2016/014229 (12 pages).
(Continued)

*Primary Examiner* — Flemming Saether
(74) *Attorney, Agent, or Firm* — Greenberg Traurig, LLP (57) ABSTRACT

A fastener includes a sleeve, a core bolt, and an insert. The sleeve includes a first portion having a first inner diameter, a second portion having a second inner diameter, and a step intermediate the first and second portions. The core bolt includes a cylindrical portion having a first diameter, a threaded portion having a major diameter, and a thread run-out intermediate the cylindrical and threaded portions. The insert is disposed within the sleeve and is sized and shaped to be retained between the step of the sleeve and the thread run-out of the core bolt when the fastener is in a pre-installation position. The fastener compresses the insert between the step of the sleeve and the thread run-out of the core bolt by an installation motion of the core bolt. The insert deforms away from the core bolt to initiate formation of a bulb in response to the compression.

11 Claims, 6 Drawing Sheets

Related U.S. Application Data filed on Feb. 19, 2015, provisional application No. 62/157,799, filed on May 6, 2015.

(51) Int. Cl.
*F16B 5/04* (2006.01)
*F16B 5/02* (2006.01)

(58) Field of Classification Search
USPC .................................................. 411/34, 38
See application file for complete search history.

(56) References Cited

U.S. PATENT DOCUMENTS

| | | | |
|---|---|---|---|
| 2,863,351 A | | 12/1958 | Vaughn |
| 2,950,602 A | * | 8/1960 | Lang ............... E21D 21/008 |
| | | | 405/259.3 |
| 2,971,425 A | | 2/1961 | Blakeley |
| 3,107,572 A | | 10/1963 | Orloff |
| 3,277,771 A | | 10/1966 | Reynolds |
| 3,345,900 A | | 10/1967 | Villo |
| 3,443,474 A | | 5/1969 | Blakeley et al. |
| 3,834,270 A | * | 9/1974 | Triplett ............. F16B 13/061 |
| | | | 411/38 |
| 3,866,998 A | | 2/1975 | Iantorno |
| 3,942,407 A | * | 3/1976 | Mortensen ......... F16B 37/067 |
| | | | 411/36 |
| 4,312,613 A | | 1/1982 | Binns |
| 4,579,491 A | * | 4/1986 | Kull ................. F16B 19/1063 |
| | | | 411/18 |
| 4,659,271 A | | 4/1987 | Pratt et al. |
| 4,789,283 A | * | 12/1988 | Crawford ......... F16B 19/008 |
| | | | 411/34 |
| 4,832,548 A | | 5/1989 | Strobel |
| 4,844,673 A | | 7/1989 | Kendall |
| 4,950,115 A | | 8/1990 | Sadri |
| 5,252,014 A | | 10/1993 | Andrews |
| 5,498,110 A | | 3/1996 | Stencel et al. |
| 5,634,751 A | | 6/1997 | Stencel et al. |
| 5,816,761 A | | 10/1998 | Cassatt et al. |
| 6,036,418 A | | 3/2000 | Stencel et al. |
| 6,213,698 B1 | | 4/2001 | Cosenza |
| 7,150,594 B2 | | 12/2006 | Keener |
| 7,308,842 B2 | | 12/2007 | Hufnagl et al. |
| 8,297,897 B2 | | 10/2012 | Auriol et al. |
| 8,322,015 B2 | | 12/2012 | Pratt et al. |
| 8,348,566 B2 | | 1/2013 | Pratt |
| 8,777,533 B2 | | 7/2014 | Hufnagl et al. |
| 8,979,453 B2 | | 3/2015 | Hufnagl et al. |
| 2009/0053006 A1 | | 2/2009 | Hufnagl et al. |
| 2010/0074710 A1 | | 3/2010 | Auriol et al. |

FOREIGN PATENT DOCUMENTS

| | | |
|---|---|---|
| CN | 101668956 A | 3/2010 |
| CN | 2013 2 1092803.2 | 4/2013 |
| CN | 201310132686.5 | 4/2013 |
| CN | 203176114 U | 9/2013 |
| CN | 103375470 A | 10/2013 |
| CN | 203321996 U | 12/2013 |
| CN | 205744760 U | 11/2016 |
| JP | 2010537139 A | 12/2010 |
| JP | 5878672 | 2/2016 |
| TW | 557338 B | 10/2003 |
| WO | 2007/100906 A2 | 9/2007 |

OTHER PUBLICATIONS

Huck Fasteners, An Alcoa business, 3724 East Columbia Street, Tucson, AZ 85714 Blind Bolt Engineering Standard Diagram No. UAB100-EU, SK12771, Issued Dec. 8, 2001; 4 pages.
Huck Fasteners, An Alcoa Business, 3724 East Columbia Street, Tucson, AZ 85714 Blind Bolt Engineering Standard Diagram No. UAB100-MV, SK12772, Issued Dec. 13, 2001; 3 pages.
Huck Fasteners, An Alcoa Business, 3724 East Columbia Street, Tucson, AZ 85714 Blind Bolt Engineering Standard Diagram No. UABP-EU, SK12756, Issued Sep. 20, 2001; 4 pages.
Alcoa Fastening Systems, 3724 East Columbia Street, Tucson, AZ 85714 Blind Bolt Engineering Standard Diagram No. UAB130-EU, SK12711, Issued Jan. 31, 2001; 4 pages.
Alcoa Fastening Systems, 3724 East Columbia Street, Tucson, AZ 85714 Blind Bolt Engineering Standard Diagram No. UAB130-MV, SK12742, Issued Jul. 12, 2001; 3 pages.
Alcoa Fastening Systems, 3724 East Columbia Street, Tucson, AZ 85714 Blind Bolt Engineering Standard Diagram No. UAB6127-EU, SK12770, Issued Dec. 8, 2001; 3 pages.
Alcoa Fastening Systems, 3724 East Columbia Street, Tucson, AZ 85714, Blind Bolt Engineering Standard Diagram No. OUAB130-EU, SK12801, Issued Apr. 19, 2004; 4 pages.
Alcoa Fastening Systems, 3724 East Columbia Street, Tucson, AZ 85714, Blind Bolt Engineering Standard Diagram No. OUAB6127-EU, SK12802, Issued Apr. 19, 2004; 3 pages.
Alcoa Fastening Systems, 3724 East Columbia Street, Tucson, AZ 85714, Blind Bolt Engineering Standard Diagram No. OUABP-EU, SK12803, Issued Apr. 19, 2004; 4 pages.
International Search Report and Written Opinion dated Jul. 18, 2013 in connection with International Application No. PCT/US2013/036129, 10 pages.

\* cited by examiner

BLIND FASTENERS

CROSS-REFERENCE TO RELATED APPLICATION

This application is a Section 111(a) application relating to and claiming the benefit of commonly-owned, U.S. Provisional Patent Application Ser. No. 62/106,499, filed Jan. 22, 2015, entitled "BLIND FASTENER," U.S. Provisional Patent Application Ser. No. 62/118,037, filed Feb. 19, 2015, entitled "BLIND FASTENER WITH METALLIC INSERT," and U.S. Provisional Patent Application Ser. No. 62/157,799, filed May 6, 2015, entitled "BLIND FASTENER WITH METALLIC INSERT," the contents of all of which are incorporated herein by reference in their entireties.

FIELD OF THE INVENTION

The present invention relates to fasteners and, more particularly, to blind fasteners for securing work pieces together.

BACKGROUND OF THE INVENTION

Blind fasteners are commonly used to secure a plurality of work pieces together when it is difficult or impossible to access a blind side of one of the work pieces. In certain applications, it is desirable that bulbed sleeves used in conjunction with such fasteners have relatively large footprints that engage the blind side of the one of the work pieces.

SUMMARY OF THE INVENTION

In an embodiment, a fastener is adapted to be installed in aligned holes of a plurality of work pieces. The plurality of work pieces includes a blind side. The aligned holes have an inner diameter. The fastener includes a sleeve, a core bolt, and an insert. The sleeve includes a tubular portion, a first end, a second end opposite the first end, an enlarged head at the first end, and a pocket formed within the enlarged head. The tubular portion includes an outer surface having an outer diameter that is sized and shaped to enable the sleeve to be installed within the aligned holes, a first portion proximate the first end and having a first inner diameter, a second portion adjacent the first portion and having a second inner diameter that is less than the first inner diameter, a third portion proximate the second end and having internal threads, and a step intermediate the first and second portions. The core bolt is disposed within the sleeve and includes a first end, a second end opposite the first end, and a shank portion between the first end and the second end. The shank portion includes a cylindrical portion proximate the first end and having a first diameter, a threaded portion proximate the second end and including threads having a major diameter that is less than the first diameter, and a thread run-out intermediate the cylindrical and threaded portions. The first diameter of the cylindrical portion of the core bolt is sized and shaped to enable the core bolt to be installed within the sleeve. The threads of the threaded portion are complementary to the internal threads of the sleeve. The core bolt is adapted to be engaged by an installation tool. The insert is disposed within the sleeve and encircles a portion of the core bolt. The insert being sized and shaped to abut and be retained between the step of the sleeve and the thread run-out of the core bolt when the fastener is in a pre-installation position. The fastener is adapted to compress the insert between the step of said sleeve and the thread run-out of the core bolt by an installation motion of the core bolt with respect to the sleeve before the installation motion of said core bolt generates a compressive load on the sleeve. The insert is adapted to deform away from the core bolt to initiate formation of a bulb adjacent the blind side of the plurality of work pieces in response to the compression.

In an embodiment, the insert is made from copper. In an embodiment, the sleeve includes a band annealed portion proximate the insert. In an embodiment, the band annealed portion is band annealed by one of a laser and a radio frequency induction coil. In an embodiment, the insert includes one of (a) a tubular member having internal threads engaging the threads of the threaded portion of the core bolt, and (b) a coil spring having a trapezoidal cross-section and coiled around and within the threads of the threaded portion of the core bolt.

In an embodiment, the core bolt includes a flush head at the first end. In an embodiment, the pocket of the sleeve is sized and shaped so as to receive the flush head of the core bolt. In an embodiment, the insert is sized such that, when the fastener is in the pre-installed position, the core bolt is positioned within the sleeve such that the core bolt can be rotated approximately two to three times with respect to the sleeve before the flush head of the core bolt seats within the pocket of the sleeve. In an embodiment, the core bolt includes an annular groove adjacent the thread run-out. In an embodiment, the core bolt includes a splined head. In an embodiment, the insert is sized such that a diameter of the bulb is greater than one and one half times the outer diameter of the tubular portion of the sleeve.

In an embodiment, a fastener is adapted to be installed in aligned holes of a plurality of work pieces including a blind side. The aligned holes have an inner diameter. The fastener includes a sleeve, a pin member, and an insert. The sleeve includes a tubular portion, a first end, a second end opposite the first end, an enlarged head at the first end, and a pocket formed within the enlarged head. The tubular portion has an outer surface having an outer diameter that is sized and shaped to enable the sleeve to be installed within the aligned holes, a first portion proximate the first end and having a first inner diameter, a second portion proximate the second end and having a second inner diameter that is greater than the first inner diameter, and a step intermediate the first and second portions. The pin member is disposed within said sleeve and has a first end, a second end opposite the first end, and a shank portion between the first end and the second end. The shank portion includes a first portion proximate the first end and having a first diameter, a second portion proximate the second end and having a second diameter that is greater than the first diameter, and a step intermediate the first and second portions. The first diameter of the first portion of the pin member and the second diameter of the second portion of the pin member are sized and shaped to enable the pin member to be installed within the sleeve. The pin member is adapted to be engaged by an installation tool. The insert is disposed within the sleeve and encircles a portion of the pin member. The insert is sized and shaped to abut and be retained between the step of the sleeve and the step of the pin member when the fastener is in a pre-installation position. The fastener is adapted to compress the insert between the step of the sleeve and the step of the pin member by an installation motion of the pin member with respect to the sleeve before the installation motion of the pin member generates a compressive load on the sleeve. The insert is adapted to deform away from the pin member to initiate formation of a bulb adjacent the blind side of the plurality of work pieces in response to the compression.

In an embodiment, the insert includes one of a flat wire and a coil spring having a square cross-section. In an embodiment, the first portion of the pin member includes a lock groove. In embodiment, the fastener also includes a lock collar surrounding the pin member and disposed within the pocket of the enlarged head of the sleeve. The lock collar is sized and shaped such that, after a fastening motion of the pin member aligns the lock groove of the pin member with the pocket of the sleeve, the lock collar seats within the lock groove of the pin member to lock the pin member in a fastened position.

In an embodiment, the pin member includes a blind head at the second end. In an embodiment, the insert is sized and shaped such that, when the fastener is in the pre-installation position, a space is formed between the blind head of the pin member and the second end of the sleeve. The space has a length that is approximately one quarter of the outer diameter of the tubular portion of the sleeve.

In an embodiment, the insert is made from copper. In an embodiment, the sleeve includes a band annealed portion proximate the insert. In an embodiment, the band annealed portion is band annealed by one of a laser and a radio frequency induction coil. In an embodiment, the insert is sized such that a diameter of the bulb is greater than one and one half times the outer diameter of the tubular portion of the sleeve.

DETAILED DESCRIPTION OF THE DRAWINGS

Referring to FIGS. 1-4, in an embodiment, a fastener 10 is a "threaded type" fastener. In an embodiment, the fastener 10 includes a core bolt 12 (e.g., a pin member), a sleeve 14, and an insert 16. In an embodiment, the fastener 10 is adapted to secure a plurality of work pieces 18, 20 to one another, and is adapted to be installed within aligned holes 22, 24 formed within the work pieces 18, 20. In an embodiment, the work piece 20 includes a blind side 26 that may be difficult or impossible to access by a user with a fastener installation tool or otherwise. In an embodiment, a portion of each of the holes 22, 24 has an inner diameter 28. In an embodiment, the hole 22 includes a countersunk portion.

Figure 1:
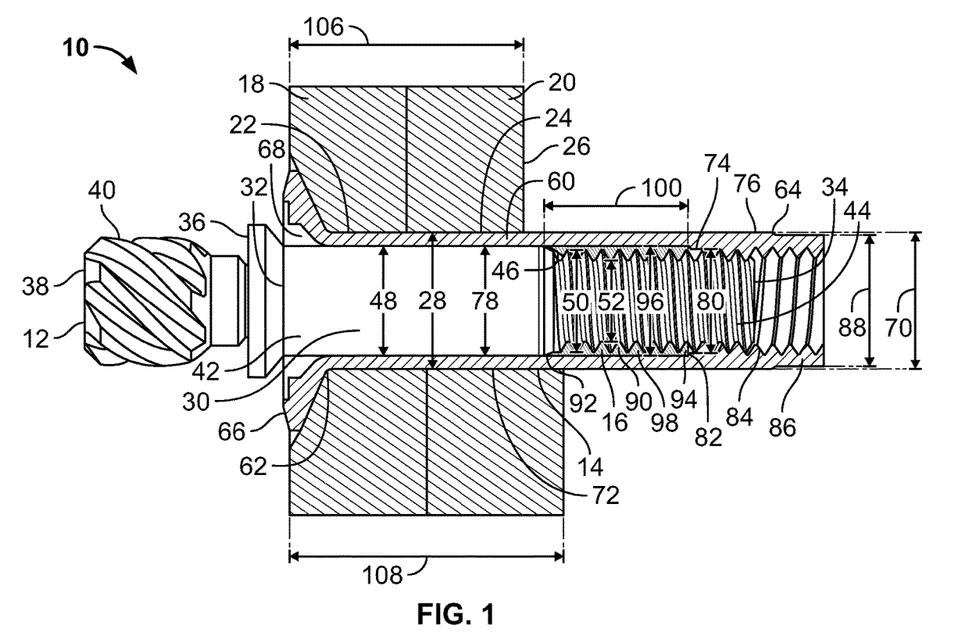
FIG. 1 illustrates a first embodiment of a fastener including a core bolt, a sleeve, and an insert, the fastener being shown in a pre-installed position.
Figure 2:
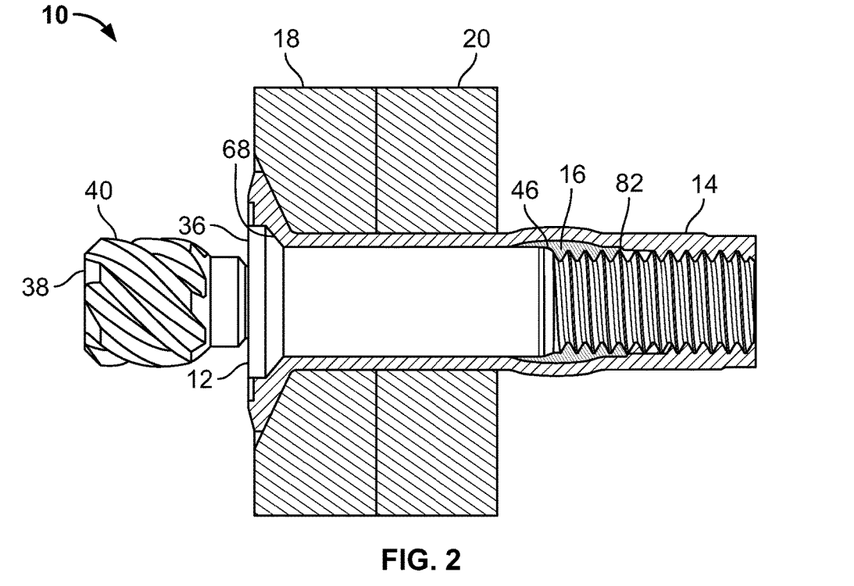
FIG. 2 illustrates the fastener of FIG. 1, the fastener being shown in an intermediate position during installation.
Figure 3:
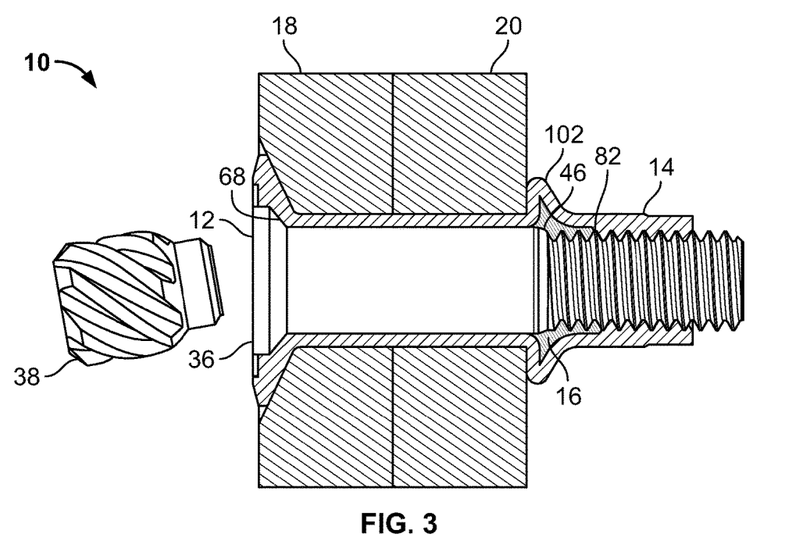
FIG. 3 illustrates the fastener of FIG. 1, the fastener being shown in an installed position.

Referring to FIGS. 1-3, in an embodiment, the core bolt 12 includes an elongated shank portion 30 extending along a longitudinal axis between a first end 32 and a second end 34 opposite the first end 32. In an embodiment, the core bolt 12 terminates with an enlarged head 36 at the first end 32. In other embodiments, the head 36 may include other shapes and sizes known in the art. In an embodiment, a fastener head 38, which is adapted to be gripped by an installation tool, extends from the enlarged flush head 36 in a direction away from the elongated shank portion 30. In an embodiment, the fastener head 38 includes a plurality of splines 40 that are adapted to be gripped by a correspondingly shaped installation tool. In an embodiment, the elongated shank portion 30 includes a substantially smooth cylindrical portion 42 adjacent the first end 32, a threaded portion 44 adjacent the second end 34, and a thread run-out 46 (i.e., a step) intermediate the smooth cylindrical portion 42 and the threaded portion 44. The smooth cylindrical portion 42 has an outer diameter 48. In an embodiment, the threaded portion 44 has a major diameter 50 that is less than the outer diameter 48 of the cylindrical portion 42. In an embodiment, the threaded portion 44 includes a minor diameter 52.

Still referring to FIGS. 1-3, in an embodiment, the sleeve 14 includes a tubular portion 60 having a first end 62 and a second end 64 opposite the first end 62. The sleeve 14 terminates with an enlarged flanged head 66 at the first end 62. In an embodiment, a pocket 68 is formed within the flanged head 66. In an embodiment, the pocket 68 is sized and shaped to receive the head 36 of the core bolt 12. In an embodiment, the tubular portion 60 includes an outer diameter 70 that is sized and shaped to enable installation of the sleeve 14 within the aligned holes 22, 24 of the work pieces 18, 20. In an embodiment, the tubular portion 60 includes a first region 72 adjacent the first end 62, a second region 74 intermediate the first end 62 and the second end 64, and a third region 76 adjacent the second end 64. In an embodiment, the first region 72 includes an inner diameter 78 that is sized and shaped to enable installation of the core bolt 12 within the sleeve 14. In an embodiment, the second region 74 includes an inner diameter 80 that is less than the inner diameter 78 of the first region 72 and greater than the major diameter 50 of the threaded portion 44 of the core bolt 12. In an embodiment, a step 82 is formed within the sleeve 14 and provides a stepped transition between the inner diameter 78 of the first region 72 and the inner diameter 80 of the second region 74. The third region 76 includes internal threads 84 that are complementary to and adapted to engage threadedly the threaded portion 44 of the core bolt 12. In an embodiment, the sleeve 14 includes a narrowed tip 86 adjacent the second end 64. In an embodiment, the narrowed tip 86 has an outer diameter 88 that is less than the outer diameter 70 of the tubular portion 60. In an embodiment, the sleeve 14 includes a band annealed portion positioned so as to be proximate the insert 16 when the fastener 10 is in a pre-installation position. In an embodiment, band annealing may be performed using a laser. In an embodiment, band annealing may be performed using a radio frequency induction coil. In an embodiment, band annealing may be performed using another suitable means known in the art. Band annealing may aid in the initiation of bulb formation, as will be described in further detail hereinafter.

In an embodiment, the insert 16 has a substantially tubular portion 90 extending from a first end 92 to a second end 94 opposite the first end 92. The tubular portion 90 has an outer diameter 96 that is sized and shaped to enable the installation of the insert 16 within the sleeve 14. In an embodiment, the outer diameter 96 of the insert 16 is substantially equal to the outer diameter 48 of the cylindrical portion 42 of the core bolt 12. In an embodiment, the tubular portion 90 has internal threads 98 that are complementary to the threaded portion 44 of the core bolt 12. In an embodiment, the tubular portion 90 has a length 100 that is selected such that, when the fastener 10 is in a pre-installation position (see FIG. 1), the first end 92 abuts the thread run-out 46 of the core bolt 12 and the second end 94 abuts the step 74 of the sleeve 14. In an embodiment, the insert 16 is formed from a material that has lubricating properties. In an embodiment, the insert 16 includes copper. In other embodiments, the insert 16 may include other materials (e.g., other metals, plastics, etc.) that have frictional properties suitable to prevent thread galling and that are sufficiently malleable to aid in bulb formation, as will be described in further detail hereinafter.

Referring now to FIG. 1, a pre-installation position of the fastener 10 is shown. The internal threads 98 of the insert 16 receive and engage threadedly the threaded portion 44 of the core bolt 12 such that the first end 92 of the insert 16 abuts the thread run-out 46 of the core bolt 12. The internal threads 82 of the sleeve 14 receive and engage threadedly the threaded portion 44 of the core bolt 12 such that the step 80 abuts the second end 94 of the insert 16, thereby trapping the insert 16 between the thread run-out 46 of the core bolt 12 and the step 80 of the of the sleeve 14. In an embodiment, the head 36 of the core bolt 12 is not seated within the pocket 68 of the sleeve 14, and is positioned such that it will seat within the pocket 68 of the sleeve 14 after some rotations (e.g., two to three rotations) of the core bolt 12 with respect to the sleeve 14.

Referring now to FIG. 2, an intermediate position of the fastener 10 during installation is shown. During installation, a torque is applied to the fastener head 38 by an installation tool that is adapted to grip the splines 40. As the core bolt 12 rotates with respect to the sleeve 14, the insert 16 is compressed between the thread run-out 46 of the core bolt 12 and the step 82 of the sleeve 14. In response to such compression, the insert 16 can only deform in an outward radial direction (i.e., away from the core bolt 12). Deformation of the insert 16 causes corresponding deformation of the sleeve 14 in an outward direction (i.e., away from the core bolt 12). Before the head 36 of the core bolt 12 is seated within the pocket 68 of the sleeve 14, no compressive force is exerted by the core bolt 12 on the sleeve 14. With continued rotation of the core bolt 12 with respect to the sleeve 14, the head 36 of the core bolt 12 advances to a point such that it is seated within the pocket 68 of the sleeve 14.

Continuing to refer to FIG. 2, once the head 36 of the core bolt 12 is seated within the pocket 68 of the sleeve 14, continued rotation of the core bolt 12 with respect to the sleeve 14 continues to compress the insert 16. As noted above, because the insert 16 is constrained between the thread run-out 46 of the core bolt 12 and the step 82 of the sleeve 14, it can only deform outwardly (i.e., away from the core bolt 12); the sleeve 14 deforms correspondingly. Such deformation of the insert 16 and the sleeve 14 causes the formation of a bulb. FIG. 3 illustrates the fastener 10 after the bulbing action of the insert 16 has been completed. A bulb 102 has been formed by the insert 16 and the sleeve 14.

Figure 4:
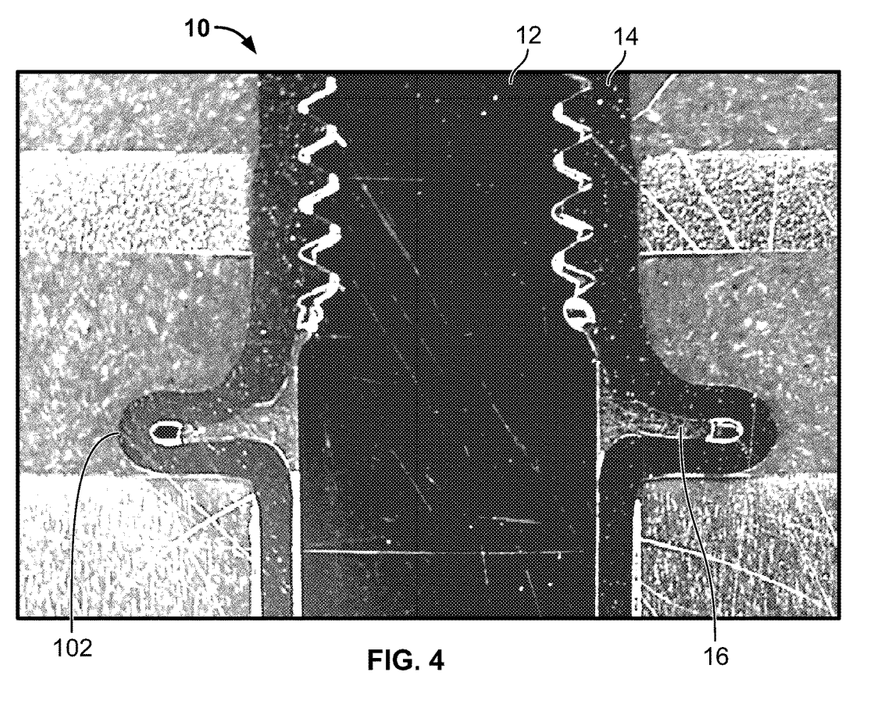
FIG. 4 is a photomicrograph of a portion of the fastener of FIG. 1, as shown in the installed position of FIG. 3.

In an embodiment, the bulb 102 has a diameter that is at least one and a half (1.5) times the outer diameter 70 of the tubular portion 60 of the sleeve 14. The work pieces 18, 20 are secured between the bulb 102, on the blind side 26 of the work piece 20, and the flanged head 66 of the sleeve 14, on the side of the work piece 18 that is accessible by an installation tool. The fastener head 38 may be sheared off from the core bolt 12 to produce an installed fastener 10 that is substantially flush with a surface of the work piece 18. FIG. 4 is a photomicrograph of a portion of the installed fastener 10 as shown in FIG. 3. It may be seen that the insert 16 has swaged outward to form the bulb 102. Referring back to FIG. 1, the fastener 10 is adapted to form the bulb 102 as described above when installed in work pieces 18, 20 having a total combined thickness of between a minimum grip 106 and a maximum grip 108.

Figure 5:
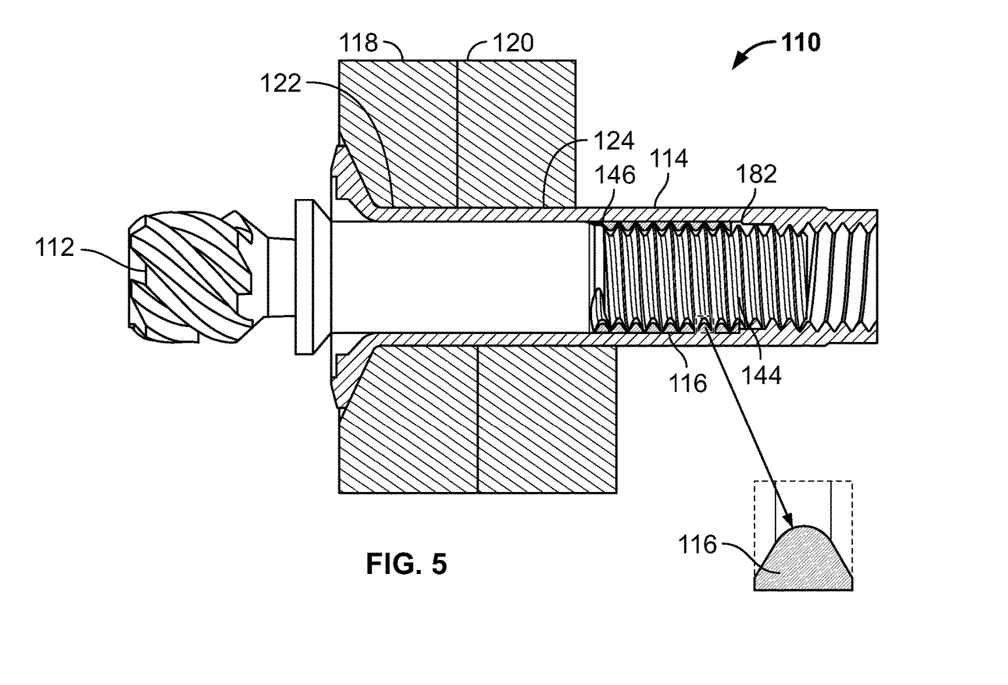
FIG. 5 illustrates a second embodiment of a fastener including a core bolt, a sleeve, and a trapezoidal section coil spring, the fastener being shown in a pre-installed position.

FIG. 5 illustrates a second embodiment of a fastener 110 in a pre-installation position. The fastener 110 may be substantially similar, in structure and operation, to the fastener 10 described above with reference to FIGS. 1-4 other than insofar as will be described herein. The fastener 110 includes a core bolt 112 and a sleeve 114, which may be substantially similar to the core bolt 12 and sleeve 14 of the fastener 10. The core bolt 112 includes, among other elements, a threaded portion 144 and a thread run-out 146. The sleeve 114 includes, among other elements, a step 182. The fastener 110 also includes a helical coil spring insert 116. In an embodiment, the coil spring insert 116 has a trapezoidal cross-section. In an embodiment, the coil spring insert 116 is sized and shaped such that it can be wrapped around the threaded portion 144 of the core bolt 112 within the sleeve 114 in a manner such that the coil spring insert 116 sits within threads of the threaded portion 144. In an embodiment, the coil spring insert 116 has an overall length that is less than that of the threaded portion 144 of the core bolt 112, and is further sized such that it extends from, and is constrained between, the thread run-out 146 of the core bolt 112 and the step 182 of the sleeve 114. In an embodiment, the coil spring insert 116 includes copper. In other embodiments, the coil spring 116 may include other suitable materials as described above with reference to the insert 16 of the fastener 10. The fastener 110 may be installed in aligned holes 122, 124 of work pieces 118, 120, and may form a bulb (not shown) when installed in the manner described above with reference to the fastener 10.

Figure 6:
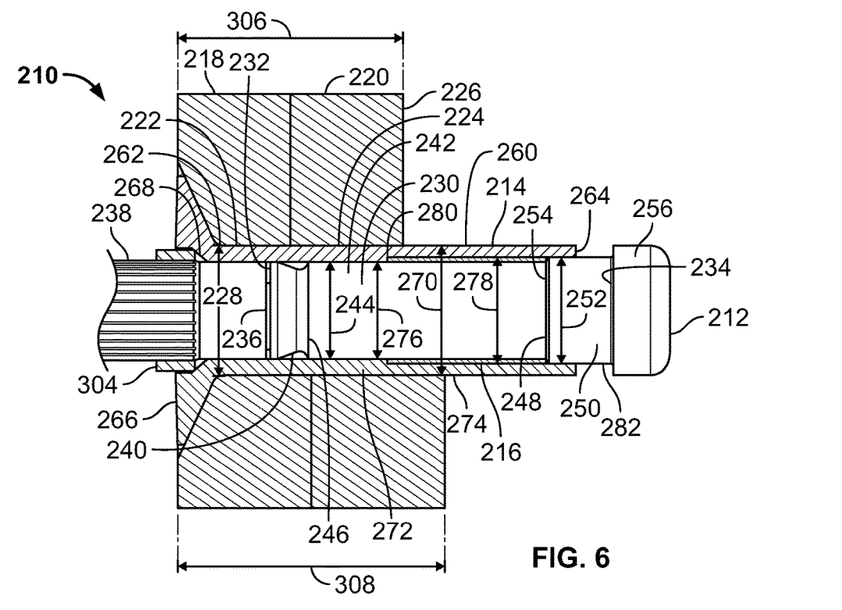
FIG. 6 illustrates a third embodiment of a fastener including a pull type pin member, a sleeve, and a flat wire insert, the fastener being shown in a pre-installed position.

FIG. 6 illustrates a third embodiment of a fastener 210 in a pre-installation position. In an embodiment, the fastener 210 is a "pull type" fastener. In an embodiment, the fastener 210 includes a pin member 212, a sleeve 214, a flat wire insert 216, and a lock collar 304. In an embodiment, the fastener 210 is adapted to secure a plurality of work pieces 218, 220 to one another, and is adapted to be installed within aligned holes 222, 224 in such work pieces 218, 220. In an embodiment, the work piece 220 includes a blind side 226 that may be difficult or impossible to access by a user with a fastener installation tool or otherwise. In an embodiment, a portion of each of the aligned holes 222, 224 has an inner diameter 228.

In an embodiment, the pin member 212 includes an elongated shank portion 230 having a first end 232 and a second end 234. The pin member 212 terminates with a breakneck 236 at the first end 332. A fastener head 238, which is adapted to be gripped by an installation tool, extends from the breakneck 236 in a direction away from the elongated shank portion 230. In an embodiment, the fastener head 238 is adapted to be gripped by a drive anvil. The elongated shank portion 230 includes a lock groove 240 proximate to the breakneck 236. A substantially smooth first cylindrical portion 242 extends from the lock groove 240 toward the second end 234. The first cylindrical portion 242 has a first diameter 244, a first end 246 proximate the lock groove 240, and a second end 248. The elongated shank portion 230 also includes a substantially smooth second cylindrical portion 250 extending from the second end 248 of the first cylindrical portion 242 to the second end 234 of the elongated shank portion 230. The second cylindrical portion 250 has a second diameter 252 that is greater than the first diameter 244. A step 254 is formed within the elongated shank portion 230 and provides a stepped transition between the first diameter 244 of the first cylindrical portion 242 and the second diameter 252 of the second cylindrical portion 250. The pin member 212 also includes a blind head 256 at the second end 234.

In an embodiment, the sleeve 214 includes a tubular portion 260 having a first end 262 and a second end 264. The sleeve 214 terminates with an enlarged flanged head 266 at the first end 262. A pocket 268 is formed within the flanged head 266. The pocket 268 is sized and shaped so as to receive the lock collar 304. The tubular portion 260 has an outer diameter 270 that is sized and shaped to enable installation of the sleeve 214 within the aligned holes 222, 224 of the work pieces 218, 220. The tubular portion 260 includes a first region 272 adjacent the first end 262 and a second region 274 adjacent the second end 264. The first region 272 has an inner diameter 276. The second region 274 has an inner diameter 278. The inner diameter 276 and the inner diameter 278 are sized and shaped to enable the pin member 212 to be installed within the sleeve 214. A step 280 is formed within the sleeve 214 and provides a stepped transition between the inner diameter 276 of the first region 272 and the inner diameter 278 of the second region 274. In an embodiment, the sleeve 214 includes a band annealed portion as described above with reference to the sleeve 14 of the fastener 10. In a pre-installation position of the fastener 210, as shown in FIG. 6, a space 282 is formed between the blind head 256 of the pin member 212 and the second end 264 of the sleeve 214. In an embodiment, the space 282 has a length, as measured between the blind head 256 of the pin member 212 and the second end 264 of the sleeve 214, that is approximately one quarter of the outer diameter 270 of the tubular portion 260 of the sleeve 214.

In an embodiment, the flat wire insert 216 is sized and shaped such that it can be wrapped around the first cylindrical portion 242 of the pin member 212. The flat wire insert 216 is further sized such that such that it extends from, and is constrained between, the step 280 of the sleeve 214 and the step 254 of the pin member 212. In an embodiment, the flat wire insert 216 includes copper. In other embodiments, the flat wire insert 216 may include other suitable materials as described above with reference to the insert 16 of the fastener 10.

In an embodiment, when the fastener 210 is engaged using a pull-type tool, the pin member 212 is pulled in a direction such that the blind head 256 of the pin member 212 is pulled toward the flanged head 266 of the sleeve 214. The pull-type tool opposes corresponding motion of the lock collar 304, which therefore remains in a constant position within and with respect to the pocket 268 of the flanged head 266 of the sleeve 214. The flat wire insert 216 is compressed between the step 254 of the pin member 212 and the step 280 of the sleeve 214 by the motion of the pin member 212, causing the flat wire insert 216 to deform outward (i.e., away from the pin member 212) and causing a bulbing action to occur as described above with reference to the fastener 10.

Once the pin member 212 has been pulled a distance such that the space 282 has been closed and the blind head 256 of the pin member 212 contacts the second end 264 of the sleeve 214, the sleeve 214 is also compressed and urged outward (i.e., away from the pin member 212) on conjunction with the bulbing of the flat wire insert 216. Together, the sleeve 214 and the flat wire insert 216 may form a bulb (not shown). Once the pin member 212 has been pulled a distance such that the lock groove 240 aligns with the pocket 268 of the flanged head 266 of the sleeve 214, the lock collar 304 is forced into the space spanning the aligned combination of the lock groove 240 and the pocket 268. When so positioned, the lock collar 304 prevents further relative motion of the pin member 212 with respect to the sleeve 214, and thereby secures the fastener 210 in its installed position. The fastener head 238 may then be sheared off at the breakneck 236, producing an installed fastener 210 that is substantially flush with a surface of the work piece 218.

Figure 7:
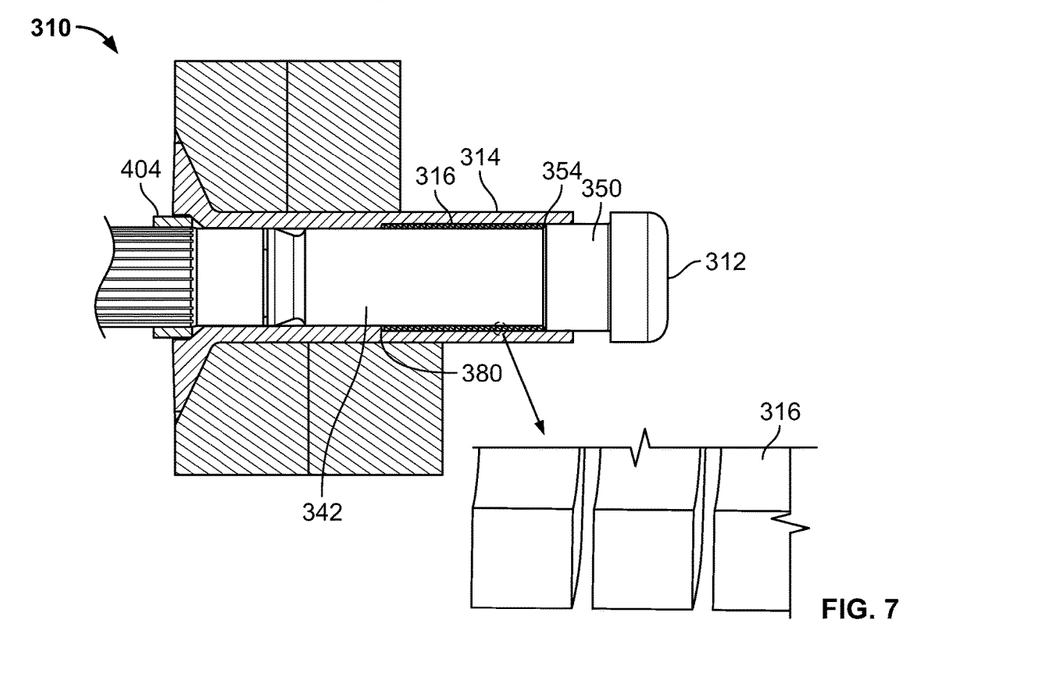
FIG. 7 illustrates a fourth embodiment of a fastener including a pull type pin member, a sleeve, and a square section coil spring, the fastener being shown in a pre-installed position.

FIG. 7 illustrates a fourth embodiment of a fastener 310 in a pre-installation position. The fastener 310 may be substantially similar, in structure and operation, to the fastener 210 described above with reference to FIG. 6 other than insofar as will be described herein. The fastener 310 includes a pin member 312, a sleeve 314, and a lock collar 404, which may be substantially similar to the pin member 212, sleeve 214, and lock collar 304 of the fastener 210. The pin member 312 includes, among other elements, a first cylindrical portion 342, a second cylindrical portion 350, and a step 354 therebetween. The sleeve 314 includes, among other elements, a step 380. The fastener 310 also includes a helical coil spring insert 316. In an embodiment, the coil spring insert 316 has a square cross-section. In an embodiment, the coil spring insert 316 is sized and shaped such that it can be wrapped over the first cylindrical portion 342 of the pin member 312 within the sleeve 314. In an embodiment, the coil spring insert 316 is further sized such that it extends from, and is constrained between, the step 354 of the pin member 312 and the step 380 of the sleeve 314. In an embodiment, the coil spring insert 316 includes copper. In other embodiments, the coil spring insert 316 may include other suitable materials as described above with reference to the insert 16 of the fastener 10. The fastener 310 may be installed in aligned holes 322, 324 of two work pieces 318, 320, and may form a bulb (not shown) when engaged by a pull-type tool and installed in the manner described above with reference to the fastener 210.

Figure 8:
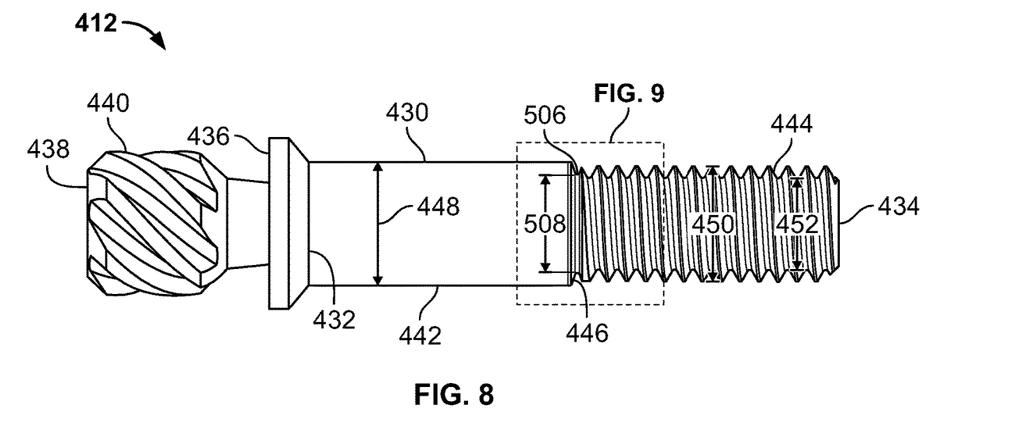
FIG. 8 illustrates a further embodiment of a core bolt.
Figure 9:
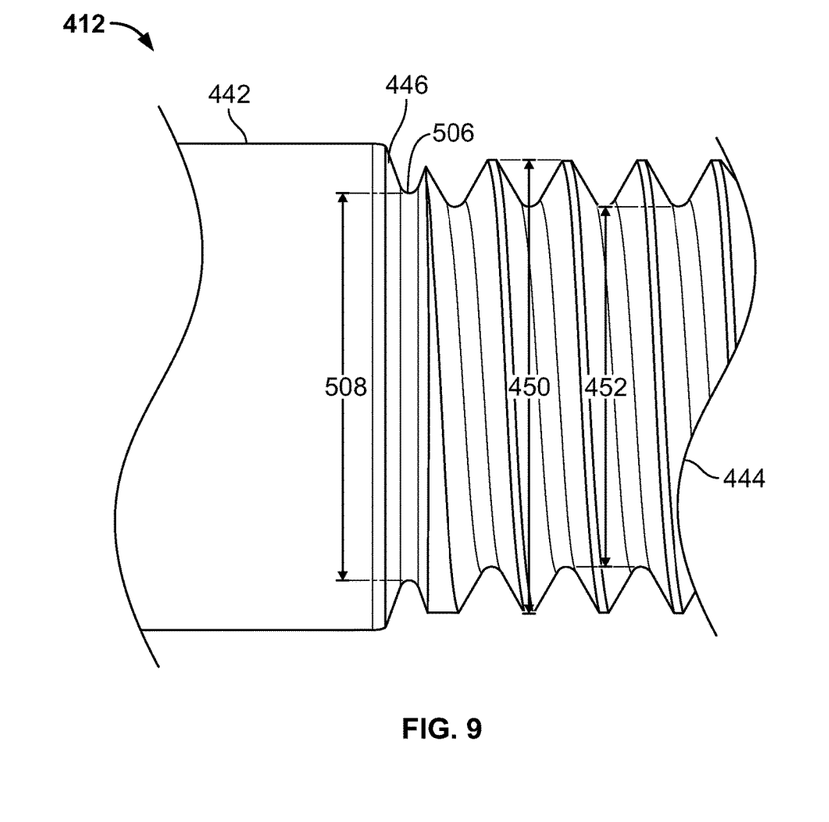
FIG. 9 illustrates a detail view of a portion of the core bolt shown in FIG. 9.
Figure 10A:
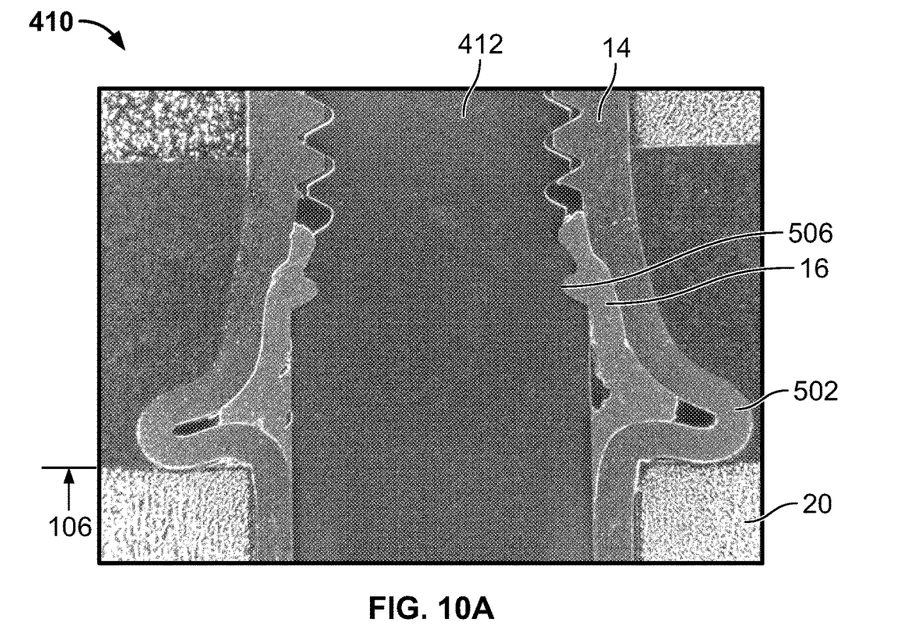
FIG. 10A is a photomicrograph of a portion of a fastener including the core bolt shown in FIG. 8, as installed in work pieces having a minimum grip length.
Figure 10B:
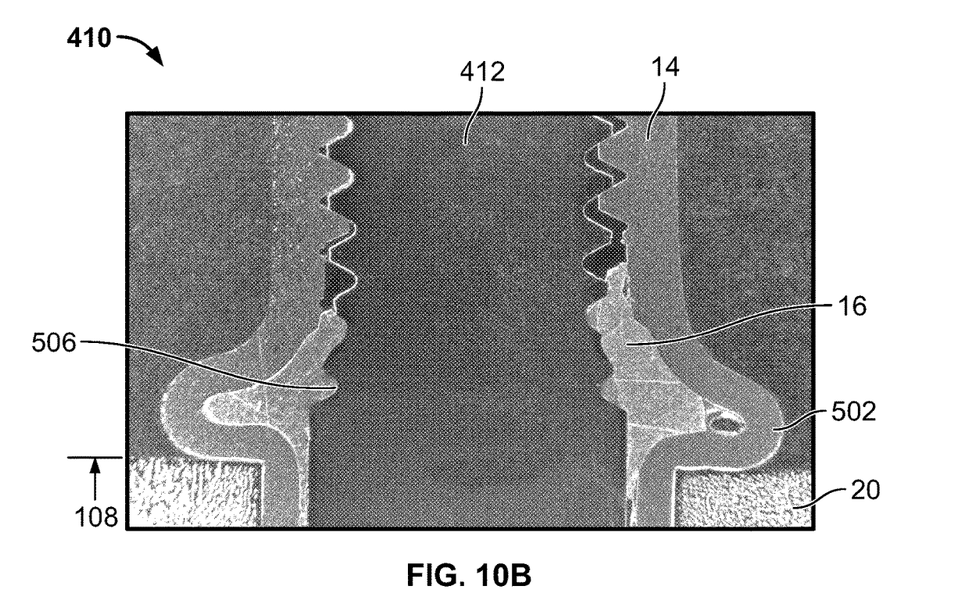
FIG. 10B is a photomicrograph of a portion of a fastener including the core bolt shown in FIG. 8, as installed in work pieces having a maximum grip length.

FIGS. 8 and 9 illustrate a core bolt 412 that may be used in conjunction with, for example, the sleeve 14 and the insert 16, which were described above with reference to the fastener 10, to provide a fifth embodiment of a fastener 410 (see FIGS. 10A-10B). In another embodiment, the core bolt 412 may be used in conjunction with the sleeve 114 and the insert 116, which were described above with reference to the fastener 110. In an embodiment, the core bolt 412 includes an elongated shank portion 430 extending along a longitudinal axis between a first end 432 and a second end 434. The core bolt 412 terminates with an enlarged flush head 436 at the first end 432. A fastener head 438, which is adapted to be gripped by an installation tool, extends from the enlarged flush head 436 in a direction away from the elongated shank portion 430. In an embodiment, the fastener head 438 includes splines 440 that are adapted to be gripped by a correspondingly shaped installation tool. The elongated shank portion 430 includes a substantially smooth cylindrical portion 442 adjacent the first end 432, a threaded portion 444 adjacent the second end 434, and a thread run-out 446 intermediate the cylindrical portion 442 and the threaded portion 444. The cylindrical portion 442 has a diameter 448. The threaded portion 444 has a major diameter 450 that is less than the diameter 448 of the cylindrical portion 442 and has a minor diameter 452. The core bolt 412 also includes an annular lock groove 506 located intermediate the cylindrical portion 442 and the thread run-out 446. The annular lock groove 506 has a diameter 508 that is less than the major diameter 450 of the threaded portion 444 and greater than the minor diameter 452 of the threaded portion 444.

FIGS. 10A and 10B are photomicrographs of a portion of the fastener 410, which includes the core bolt 412, the sleeve 14, and the insert 16, shown in an installed position such that a bulb 502 has been formed. FIG. 10A shows the fastener 410 as used to fasten work pieces 18, 20 that are sized such that the fastener 410 is in a minimum grip position 106; FIG. 10B shows the fastener 410 as used to fasten work pieces 18, 20 that are sized such that the fastener 410 is in a maximum grip position 108. In both FIG. 10A and FIG. 10B, it may be seen that the insert 16 deforms and swages into the annular lock groove 506 and the threads of the threaded portion 444 of the core bolt 412. Such positioning of the insert 16 generates a mechanical lock that retains the fastener 410 in its installed position.

The various embodiments of an insert for a blind fastener described herein (i.e., the insert 16, the coil spring insert 116, the flat wire insert 216, and the coil spring insert 316, collectively "the inserts") initiate the bulbing process before any compressive load is generated on the corresponding sleeves. The inserts help to stabilize the bulbing process to form robust, symmetrical bulbs. The bulbs so formed have diameters that are at least one and a half (1.5) times the diameter of the corresponding sleeves before bulb formation. The inserts provide lubrication within the corresponding sleeves, thereby preventing galling in the threads of the corresponding core bolts. The inserts provide a shock absorbing cushion in the corresponding assembled fasteners.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A fastener, comprising:
    a sleeve having a tubular portion, a first end, a second end opposite said first end, and a head located at said first end, said tubular portion including a first portion proximate to said first end and having a first inner diameter, a second portion adjacent said first portion and having a second inner diameter that is less than said first inner diameter of said first portion, a third portion proximate to said second end and having an internal threads, and a step located intermediate said first and second portions;
    a core bolt disposed within said sleeve and having a first end, a second end opposite said first end of said core bolt, and a shank portion between said first and second ends of said core bolt, said shank portion including a threaded portion proximate to said second end of said core bolt including an external thread, and a thread run-out said external thread of said threaded portion engage threadedly said internal thread of said sleeve; and
    an insert disposed within said sleeve and encircling a portion of said core bolt, said insert being sized and shaped to abut and be retained between said step of said sleeve and said thread run-out of said core bolt when said fastener is in a pre-installation position,
    wherein said insert is adapted to be compressed between said step of said sleeve and said thread run-out of said core bolt by an installation motion of said core bolt with respect to said sleeve before said installation motion of said core bolt generates a compressive load on said sleeve, and wherein said insert is adapted to deform away from said core bolt to initiate formation of a bulb at said second end of said sleeve in response to said compression.

2. The fastener of claim 1, wherein said insert is made from copper.

3. The fastener of claim 2, wherein said sleeve includes a band annealed portion proximate said insert.

4. The fastener of claim 3, wherein said band annealed portion is band annealed by one of a laser and a radio frequency induction coil.

5. The fastener of claim 3, wherein said insert includes a tubular member having an internal thread engaged threadedly with said external thread of said threaded portion of said core bolt.

6. The fastener of claim 5, wherein said core bolt includes a head at said first end.

7. The fastener of claim 6, wherein said head of said sleeve includes a pocket sized and shaped to receive said head of said core bolt.

8. The fastener of claim 7, wherein said insert is sized such that when said fastener is in its pre-installation position, said core bolt is positioned within said sleeve such that said core bolt can be rotated approximately two to three times with respect to said sleeve before said head of said core bolt seats within said pocket of said sleeve.

9. The fastener of claim 8, wherein said core bolt includes an annular groove adjacent said thread run-out.

10. The fastener of claim 8, wherein said core bolt includes a splined head.

11. The fastener of claim 10, wherein said insert is sized such that a diameter of said bulb is greater than one and one half times an outer diameter of said tubular portion of said sleeve.

* * * * *